United States Patent
Pan et al.

(10) Patent No.: US 9,893,860 B2
(45) Date of Patent: Feb. 13, 2018

(54) METHOD AND DEVICE FOR TRANSMITTING CONTROL INFORMATION

(75) Inventors: Xueming Pan, Beijing (CN); Zukang Shen, Beijing (CN); Rui Zhao, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 0 days.

(21) Appl. No.: 14/356,592

(22) PCT Filed: Jul. 3, 2012

(86) PCT No.: PCT/CN2012/078094
§ 371 (c)(1),
(2), (4) Date: May 6, 2014

(87) PCT Pub. No.: WO2013/067823
PCT Pub. Date: May 16, 2013

(65) Prior Publication Data
US 2015/0295688 A1   Oct. 15, 2015

(30) Foreign Application Priority Data
Nov. 7, 2011   (CN) .......................... 2011 1 0349125

(51) Int. Cl.
H04W 4/00   (2009.01)
H04L 5/00   (2006.01)
(Continued)

(52) U.S. Cl.
CPC ......... H04L 5/0053 (2013.01); H04B 7/0667 (2013.01); H04B 7/0671 (2013.01);
(Continued)

(58) Field of Classification Search
USPC .......... 370/241–280, 311–341; 455/410–522
See application file for complete search history.

(56) References Cited

U.S. PATENT DOCUMENTS 8,463,262 B2 * 6/2013 Kwon .................. H04L 5/0091
455/434
8,472,466 B2 * 6/2013 Seo ....................... H04L 1/0071
370/341

(Continued)

FOREIGN PATENT DOCUMENTS

CN         102082600 A    6/2011
CN         102420685 A    4/2012
KR   10-2009-0083269 A    8/2009

OTHER PUBLICATIONS

Samsung, "Discussion on ePDCCH Design Issues", 3GPP TSG-RAN1#66 Meeting, R1-112517, Athens, Greece, 4 pages, (Aug. 22-26, 2011).

(Continued)

*Primary Examiner* — Man Phan
(74) *Attorney, Agent, or Firm* — Blakely, Sokoloff, Taylor & Zafman LLP

(57) ABSTRACT

Disclosed are a method and device for transmitting control information, to provide a control information sending manner based on a diversity transmission mode. The method for transmitting control information includes: determining the transmission of a plurality of enhanced control channel units (E-CCE) of an enhanced physical downlink control channel (E-PDCCH), each E-CCE containing the same number of enhanced resource unit groups (E-REGs), and a plurality of E-REGs contained in each E-CCE respectively belonging to a different frequency resource block (RB); and bearing each piece of downlink control information (DCI) to be transmitted over the E-PDCCH into at least one E-CCE for transmission. It is realized that each portion of one piece of DCI is respectively borne onto a plurality of frequency bands corresponding to the E-PDCCH for transmission, improving the stability and reliability of DCI transmission.

16 Claims, 9 Drawing Sheets

(51) Int. Cl.
*H04B 7/12* (2006.01)
*H04B 7/06* (2006.01)

(52) U.S. Cl.
CPC ............. *H04B 7/12* (2013.01); *H04L 5/0007* (2013.01); *H04L 5/0041* (2013.01); *H04B 7/0617* (2013.01); *H04B 7/0689* (2013.01)

(56) References Cited

U.S. PATENT DOCUMENTS

| | | | | |
|---|---|---|---|---|
| 8,626,218 | B2* | 1/2014 | Wang | H04L 5/003 370/241 |
| 8,804,586 | B2* | 8/2014 | Fong | H04L 5/0053 370/311 |
| 8,913,576 | B2* | 12/2014 | Shan | H04L 5/0048 370/329 |
| 9,008,035 | B2* | 4/2015 | Qu | H04L 5/0016 370/330 |
| 9,144,070 | B2* | 9/2015 | Yang | H04L 5/0007 |
| 9,198,181 | B2* | 11/2015 | Blankenship | |
| 9,391,737 | B2* | 7/2016 | Papasakellariou | H04W 72/04 |
| 9,392,589 | B2* | 7/2016 | Kim | H04L 5/0053 |
| 9,398,581 | B2* | 7/2016 | Dai | H04W 72/042 |
| 9,609,640 | B2* | 3/2017 | Dai | H04W 72/00 |
| 2011/0075624 | A1* | 3/2011 | Papasakellariou | H04L 5/0053 370/329 |
| 2011/0269492 | A1 | 11/2011 | Wang | |
| 2013/0039284 | A1* | 2/2013 | Marinier | H04L 5/001 370/329 |
| 2013/0107822 | A1* | 5/2013 | Papasakellariou | H04L 1/0045 370/329 |
| 2013/0194931 | A1* | 8/2013 | Lee | H04L 5/0053 370/241 |
| 2013/0294362 | A1* | 11/2013 | Xu | H04W 72/042 370/329 |
| 2014/0211730 | A1* | 7/2014 | Seo | H04L 5/0053 370/329 |
| 2014/0293946 | A1* | 10/2014 | Suzuki | H04W 48/12 370/329 |
| 2014/0328302 | A1* | 11/2014 | Park | H04L 5/0037 370/329 |
| 2015/0131560 | A1* | 5/2015 | Von Elbwart | H04W 72/048 370/329 |
| 2016/0105266 | A1* | 4/2016 | Heo | H04L 5/001 370/329 |

OTHER PUBLICATIONS

Intel Corporation, "On Downlink Control Signalling Enhancement", 3GPP TSG RAN WG1 Meeting #66, R1-112219, Athens, Greece, 4 pages, (Aug. 22-26, 2011).
Potevio, "Considerations on Enhanced Downlink Control Channel Design", 3GPP TSG RAN WG1 Meeting#66bis, R1-113030, Zhuhai, China, 3 pages, (Oct. 10-14, 2011).
Etri, "Discussions on Enhanced PDCCH in Rel-11", 3GPP TSG RAN WG1 Meeting #66bis, R1-113067, Zhuhai, China, 4 pages, (Oct. 10-14, 2011).
Sharp, "DL Control Channel Enhancement for DL MIMO in Rel.11", 3GPP TSG RAN WG1 Meeting #66bis, R1-113352, Zhuhai, China, 6 pages, (Oct. 10-14, 2011).
EPO Communication enclosing Extended European Search Report for Counterpart European Patent Application No. 12847266.9, 8 pages, (Oct. 20, 2014).
Office Action for corresponding Korean Patent Application No. 10-2014-7014931, 4 pages, (Jul. 31, 2015).
Etri, "Discussions on Enhanced PDCCH Structure", 3GPP TSG RAN WG1 Meeting #66, R1-112211, Athens, Greece, 3 pp., (Aug. 22-26, 2011).
PCT International Search Report for PCT Counterpart Application No. PCT/CN2012/078094 with full English translation, 4 pgs. (Nov. 1, 2011).
Motorola Mobility, "Enhanced Control Channels for LTE Rel-11", 3GPP TSG RAN WG1 #66bis, Draft No. R1-113261, Zhuhai, China, 3 pages, (Oct. 10-15, 2011).
Office Action for corresponding Japanese Patent Application No. 2014-540293, 3 pages, (Jun. 23, 2015).
PCT Written Opinion of the International Searching Authority for PCT Counterpart Application No. PCT/CN2012/078094, 20 pages (including English translation), (Nov. 1, 2012).
PCT Notification Concerning Transmittal of International Preliminary Report on Patentability (Chapter I of the Patent Cooperation Treaty) for PCT Counterpart Application No. PCT/CN2012/078094, 23 pages (including English translation), (May 22, 2014).
Alcatel-Lucent, et al., "PDCCH Enhancement in Rel-11", 3GPP TSG RAN WG1 Meeting #66, R1-112421, Athens, Greece, 7 pages, (Aug. 22-26, 2011).
Alcatel-Lucent, et al., "Design Details for Enhanced PDCCH", 3GPP TSG RAN WG1 Meeting #66bis, R1-113322, Zhuhai, China, 6 pages, (Oct. 10-14, 2011).
NEC Group, "DL Control Channel Enhancements for Rel-11", 3GPP TSG RAN WG1 Meeting #66, R1-112135, Athens, Greece, 9 pages, (Aug. 22-26, 2011).
LG Electronics, "Consideration on Transmit Diversity Scheme for Enhanced PDCCH Transmission", 3GPP TSG RAN WG1 Meeting #66bis, R1-113194, Zhuhai, China, 7 pages, (Oct. 10-14, 2011).

* cited by examiner

METHOD AND DEVICE FOR TRANSMITTING CONTROL INFORMATION

CROSS-REFERENCE TO RELATED APPLICATIONS

The present application is a U.S. National Stage of International Application No. PCT/CN2012/078094, filed Jul. 3, 2012, designating the United States, and claiming priority to the Chinese Patent Application No. 201110349125.1 filed with the Chinese Patent Office on Nov. 7, 2011, entitled "METHOD AND DEVICE FOR TRANSMITTING CONTROL INFORMATION", which was incorporated by reference in its entirety.

FIELD OF THE INVENTION

The present invention relates to the field of communications, and particularly to a method and device for transmitting control information.

BACKGROUND OF THE INVENTION

In order to improve the performance of an LTE-A (Long Term Evolution-Advanced) system and increase the capacity of a PDCCH (Physical Downlink Control Channel), an E-PDCCH (Enhanced PDCCH) is introduced into the Rel-11. The present standard has determined that the E-PDCCH supports two modes of beam forming transmission and diversity transmission, which are applied to different scenarios. For the diversity transmission mode, the specific transmission solution has not been proposed.

In an LTE system, the PDCCH is transmitted in each radio subframe and forms a TDM (Time Division Multiple) relation together with a PDSCH (Physical Downlink Shared Channel). As shown in FIG. 1, the PDCCH is transmitted through the first N OFDM (Orthogonal Frequency Division Multiplex) symbols of one downlink subframe, wherein the value of N may be 1, 2, 3 or 4, and N=4 is merely permitted in a system with a system bandwidth of 1.4 MHz. A control area for transmitting the PDCCH in the LTE system is formed by logically divided CCEs (Control Channel Elements), wherein the mapping from the CCEs to REs (Resource Elements) adopts a complete interleaving manner. The transmission of DCI (Downlink Control Information) is also based on the CCEs serving as units, one DCI for one UE may be transmitted in N continuous CCEs, and the value of N in the LTE system may be 1, 2, 4 or 8 and is referred to as a CCE aggregation level. The UE (User Equipment) performs PDCCH blind decoding in the control area to search whether the PDCCH transmitted for the UE exists, the blind decoding means decoding attempt is performed on the DCI of different formats and the different CCE aggregation level by using an RNTI (radio network temporary identifier) of the UE, and if the decoding is correct, the DCI for the UE is received. The LTE UE in a non-DRX (Discontinuous Reception) state needs to perform blind decoding on the control area in each downlink subframe to search for the PDCCH.

Due to the introduction of technologies of MU-MIMO (Multi-user Multiple Input Multiple Output), COMP (Cooperative Multiple Points), carrier aggregation and the like and configurations of RRHs (Remote Radio Heads) with the same cell ID, 8 antennas and the like, the capacity and transmission efficiency of the PDSCH of the LTE-A (Long Term Evolution-Advanced) system are greatly improved; and compared with an early LTE release (such as Rel-8/9), the PDCCH of the LTE-A system is not improved as a result of the new technologies.

On the one hand, the application of the new technologies enables the PDSCH to simultaneously provide data transmission for more users, thus greatly increasing the requirement for the capacity of the PDCCH; and on the other hand, the new technologies of DM-RS (Demodulation Reference Symbol) used in the PDSCH, R-PDCCH (Relay PDCCH) used in Relay backhaul and the like provide followable technology and experience for enhancement of the PDCCH.

To solve the problem that the capacity of the downlink control channel is limited and improve the transmission efficiency of the downlink control information, one solution is to reserve the original PDCCH field and transmit an enhanced PDCCH (namely E-PDCCH) in the PDSCH field of the downlink subframe, as shown in FIG. 2. The original PDCCH field still adopts the existing transmitting method and receiving method and uses the original PDCCH resources, for example, adopts transmission diversity during transmitting, performs blind decoding on the DCI in a common search space and a UE-specific search space based on a CRS (Cell-specific Reference Signal) during receiving, and occupies the first N OFDM symbols for transmitting, wherein the value of N may be 1, 2, 3 or 4, N=4 is merely permitted in the system with the system bandwidth of 1.4 MHz, and this PDCCH field is referred to as a legacy PDCCH (original PDCCH or legacy PDCCH) field.

The E-PDCCH field may use more advanced transmitting and receiving methods, for example, adopts pre-coding during transmitting, performs decoding based on DM-RS during receiving, occupies time frequency resources for transmitting other than the legacy PDCCH field, uses a part of resources of the original PDSCH and is multiplexed with the PDSCH in a frequency division manner, and this PDCCH field is referred to as the Enhanced PDCCH (E-PDCCH) field. This solution of multiplexing the E-PDCCH and the PDSCH in the frequency division manner is referred to as an FDM E-PDCCH (frequency division multiplexing E-PDCCH).

The present standard has determined that the E-PDCCH supports two modes of beam forming transmission and diversity transmission, which are applied to different scenarios. Generally, the beam forming transmission mode is mostly used in a scenario that a base station can obtain relatively precise channel information fed back by a UE and the change of neighbor cell interference is not very severe along with the change of a subframe, and in this case, the base station selects continuous frequency resources with relatively high quality according to the CSI fed back by the UE to transmit the E-PDCCH for the UE and performs beam forming processing to improve the transmission performance. Under the condition that the channel information cannot be accurately obtained or the change of the neighbor cell interference is severe along with the change of the subframe and unpredictable, the E-PDCCH needs to be transmitted in the frequency diversity manner, namely transmitted by using frequency resources with discontinuous frequencies.

FIG. 3A shows an example of transmitting the E-PDCCH by using the continuous frequency resources, FIG. 3B shows an example of transmitting the E-PDCCH by using the discontinuous frequency resources, the transmission of one DCI in each example occupies the resources in four PRB pairs; and several basic concepts will be illustrated below.

A PRB (Physical Resource Block) is a resource unit consisting of one slot in a time domain and one RB in a frequency domain; wherein, the one slot consists of 7 continuous OFDM symbols under the normal CP condition or 6 continuous OFDM symbols under the extended CP condition, and the following described CP takes a normal CP as an example; and the one RB consists of 12 continuous subcarriers in the frequency domain.

A PRB pair is a resource unit consisting of two slots in one subframe in the time frequency and one RB in the frequency domain.

A legacy PDCCH, namely a PDCCH defined in the LTE Rel-8/9/10, is transmitted in a carrier to which an LTE Rel-8/9/10 UE can access, occupies the whole system bandwidth in the frequency domain, and occupies the first 1, 2, 3 or 4 continuous OFDM symbols of the first slot in a downlink subframe in the time domain; and in an added type of carrier to which an LTE Rel-8/9/10 UE cannot access, the legacy PDCCH may not be transmitted.

SUMMARY OF THE INVENTION

Aiming at the problem that a diversity mode is not provided for transmitting control information in the prior art, embodiments of the present invention provide a method and device for transmitting control information in a diversity mode and a method and device for receiving the transmitted control information, to provide a manner of transmitting control information in a diversity transmission mode.

A method for transmitting control information, including:

determining a plurality of enhanced control channel elements (E-CCEs) for transmitting an enhanced physical downlink control channel (E-PDCCH), wherein each E-CCE includes a same number of enhanced resource element groups (E-REGs), and each of a plurality of E-REGs included in one E-CCE belongs to a different frequency resource block (RB), respectively; and bearing each downlink control information (DCI) to be transmitted over the E-PDCCH into at least one E-CCE for transmission.

A method for receiving control information, including:

receiving at least one DCI to be transmitted over an E-PDCCH in a plurality of E-CCEs for transmitting the E-PDCCH, wherein each DCI is borne in at least one E-CCE, each E-CCE includes a same number of E-REGs, and each of a plurality of E-REGs included in one E-CCE belongs to a different frequency RB, respectively.

A device for transmitting control information, including:

an E-CCE determining component, configured to determine a plurality of E-CCEs for transmitting an E-PDCCH, wherein each E-CCE includes a same number of E-REGs, and each of a plurality of E-REGs included in one E-CCE belongs to a different frequency RB, respectively;

an information mapping component, configured to bear each DCI to be transmitted over the E-PDCCH into at least one E-CCE; and an information transmitting component, configured to transmit the E-CCE bearing the DCI.

A device for receiving control information, including:

a receiving component, configured to receive a plurality of E-CCEs for transmitting an E-PDCCH, wherein each E-CCE includes a same number of E-REGs, and each of a plurality of E-REGs included in one E-CCE belongs to a different frequency RB, respectively; and a control information obtaining component, configured to obtain at least one DCI to be transmitted over the E-PDCCH from the plurality of E-CCEs.

In the embodiments of the present invention, the plurality of E-CCEs for transmitting the E-PDCCH are determined, wherein each E-CCE includes the same number of E-REGs, and each of the plurality of E-REGs included in one E-CCE belongs to a different RB, respectively; and each DCI to be transmitted over the E-PDCCH is borne into at least one E-CCE for transmission. By adopting the technical solution of the present invention, because each of the plurality of E-REGs included in one E-CCE belongs to a different RB, respectively, modulation symbols of the DCI may be diversified into different E-REGs for transmission by bearing each DCI to be transmitted into at least one E-CCE, thus all portions in one DCI are borne into a plurality of different frequency band resources corresponding to the E-PDCCH for transmission respectively, and stability and reliability of DCI transmission are improved.

DETAILED DESCRIPTION OF THE EMBODIMENTS

Aiming at the problem that a diversity mode is not provided for transmitting control information in the prior art, embodiments of the present invention provide a method and device for transmitting control information in a diversity mode and a method and device for receiving the transmitted control information. The method for transmitting control information in an embodiment of the present invention includes: determining a plurality of E-CCEs for transmitting an E-PDCCH, wherein each E-CCE includes the same number of E-REGs, and each of a plurality of E-REGs included in one E-CCE belongs to a different frequency RB, respectively; and bearing each DCI to be transmitted over the E-PDCCH into at least one E-CCE for transmission. By adopting the technical solution of the present invention, because each of the plurality of E-REGs included in one E-CCE belongs to a different frequency RB, respectively, modulation symbols of each DCI to be transmitted may be diversified on different E-REGs for transmission by bearing the DCI into at least one E-CCE, thus one DCI is transmitted on a plurality of different frequency band resources corresponding to the E-PDCCH, and stability and reliability of DCI transmission are improved.

The technical solution of the present invention will be described in detail below in conjunction with the accompanying drawings.

Figure 1:
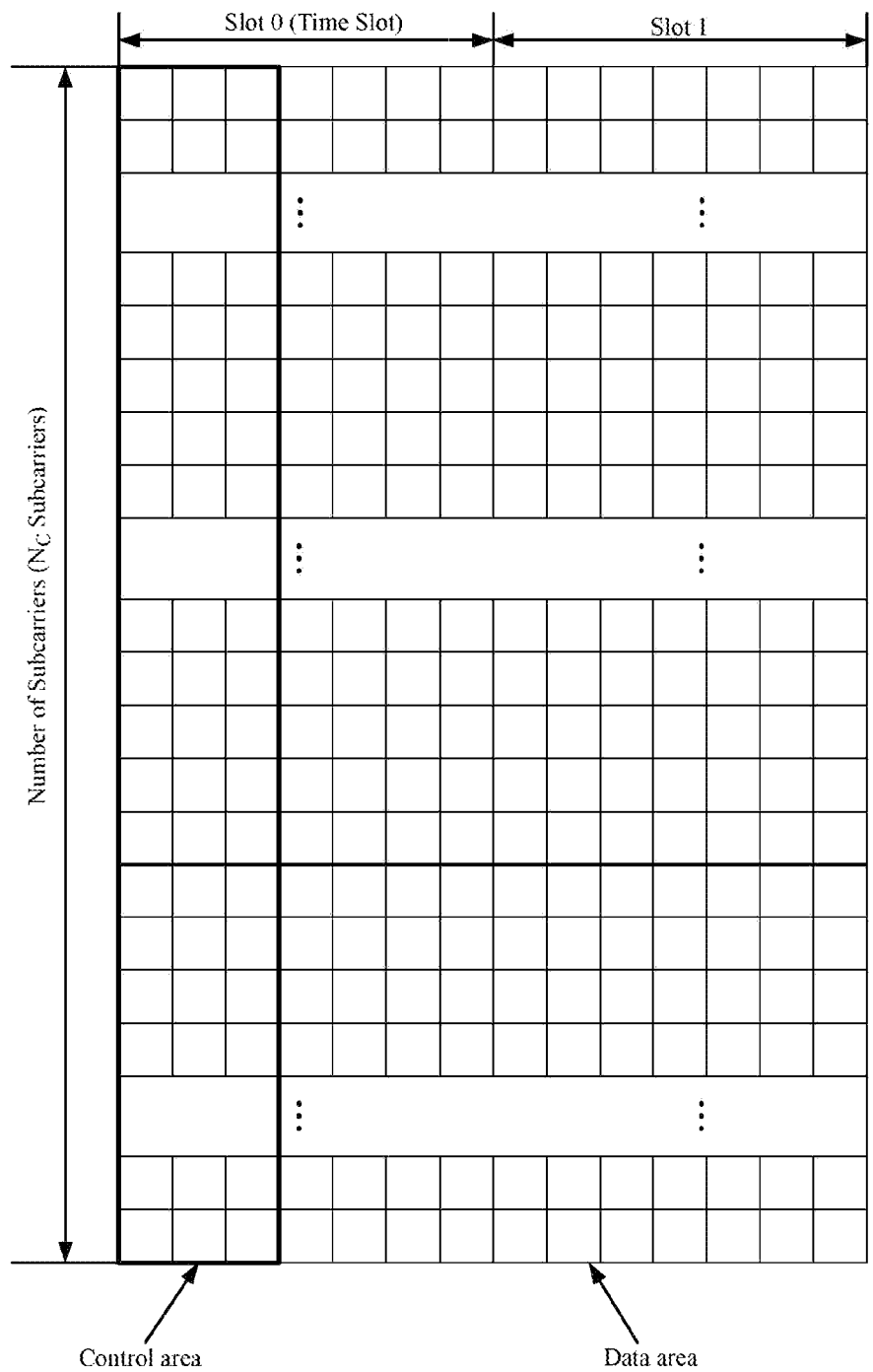
FIG. 1 is a schematic diagram of a multiplexing relation between a control area and a data area in a downlink subframe in the prior art.
Figure 2:
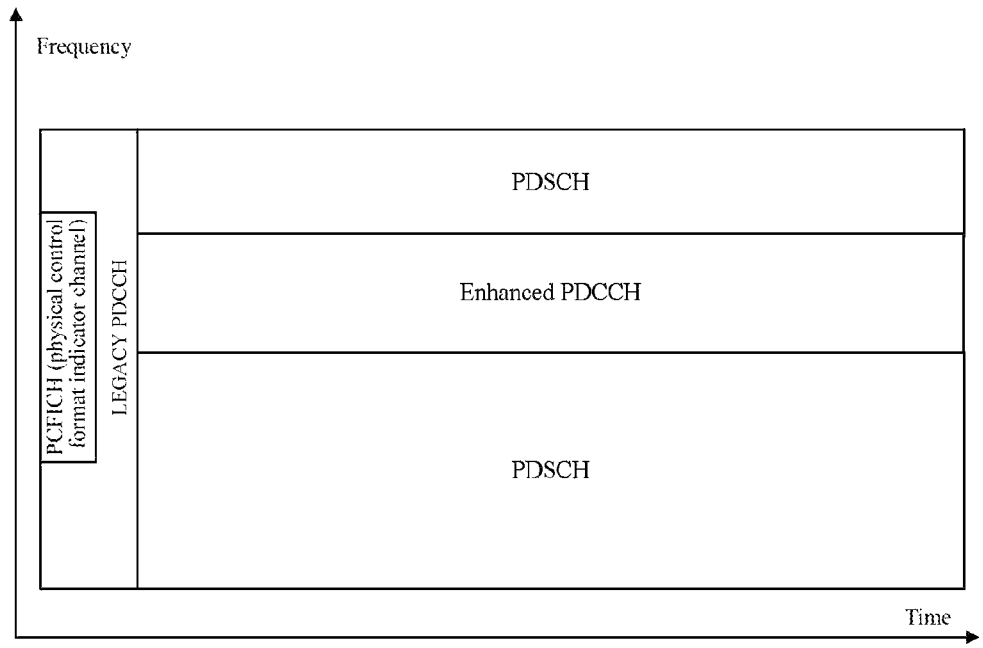
FIG. 2 is a schematic diagram of a position of an E-PDCCH in the prior art.
Figure 3A:
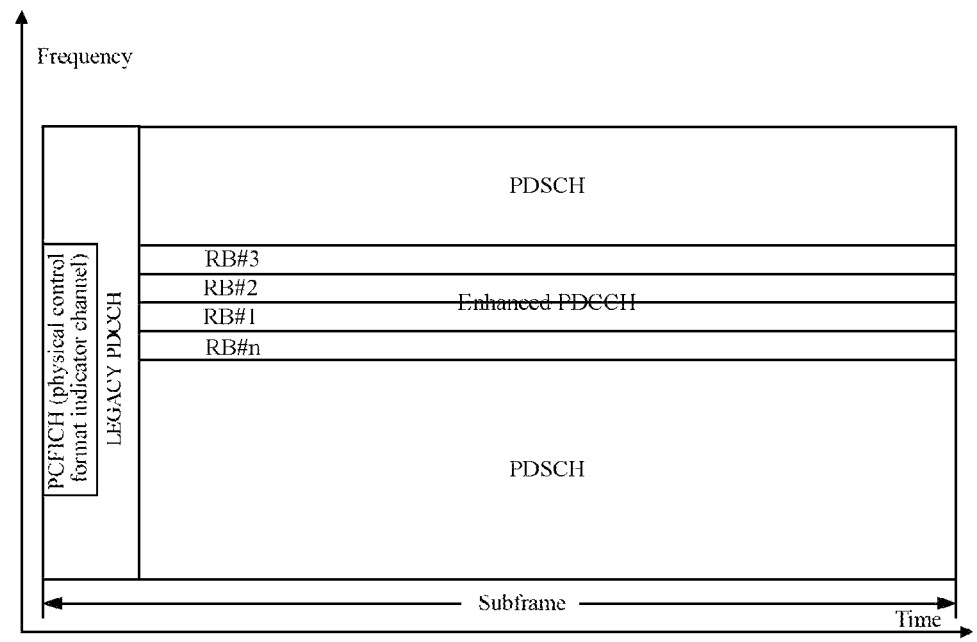
FIG. 3A is a schematic diagram of transmitting an E-PDCCH by using continuous frequency resources in the prior art.
Figure 3B:
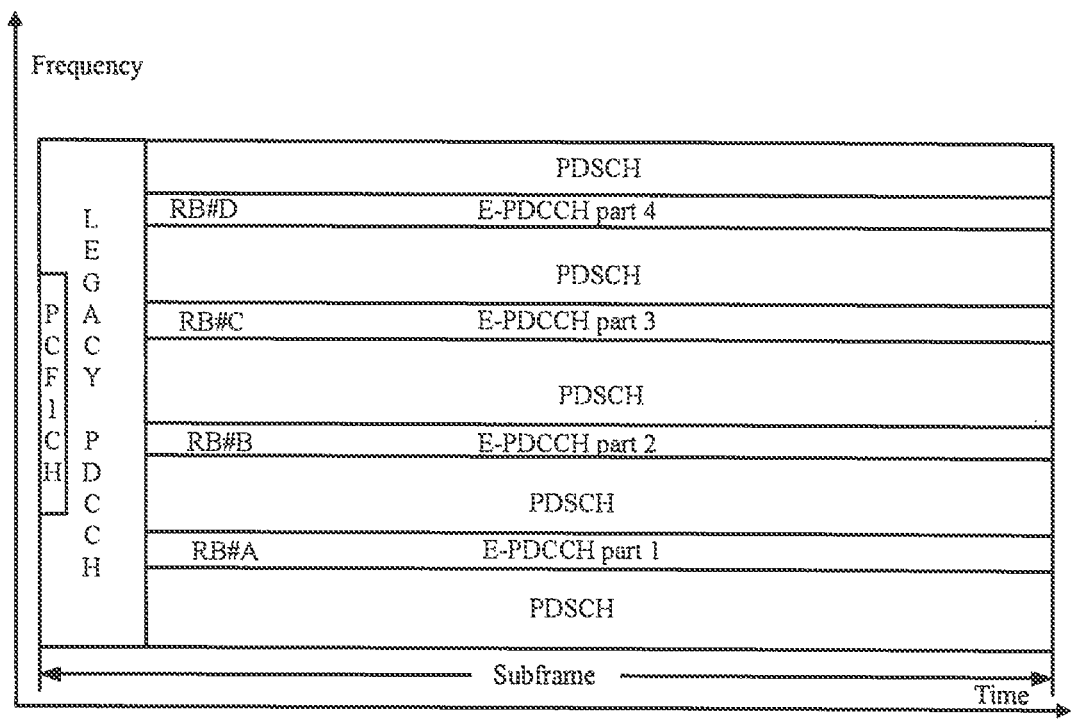
FIG. 3B is a schematic diagram of transmitting an E-PDCCH by using discontinuous frequency resources in the prior art.
Figure 4:
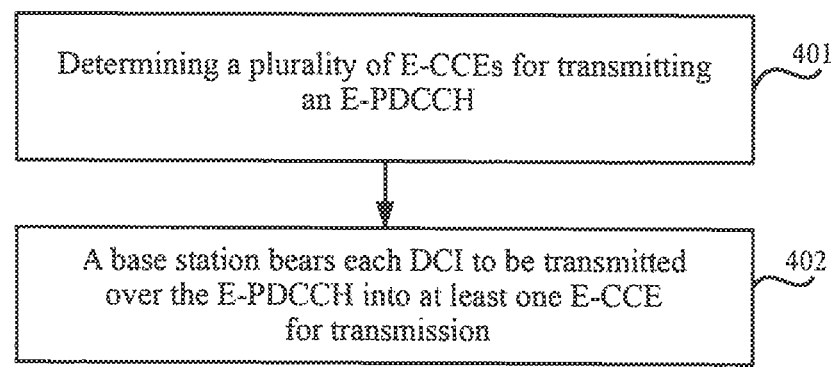
FIG. 4 is a flow chart of a method for transmitting control information at a network side in an embodiment of the present invention.

With reference to FIG. 4, a method for transmitting control information at a network side in an embodiment of the present invention includes the following steps.

Step 401, a base station determines a plurality of E-CCEs for transmitting an E-PDCCH.

In the embodiment of the present invention, each E-CCE includes the same number of E-REGs (Enhanced Resource Element Groups), and each of a plurality of E-REGs included in one E-CCE belongs to a different frequency RB (Frequency Resource Block), respectively. The RBs are allocated to a UE (namely a user equipment) by the base station and discretely distributed in a system bandwidth.

Step 402, the base station bears each DCI to be transmitted over the E-PDCCH into at least one E-CCE in the plurality of E-CCEs for transmission.

Figure 5:
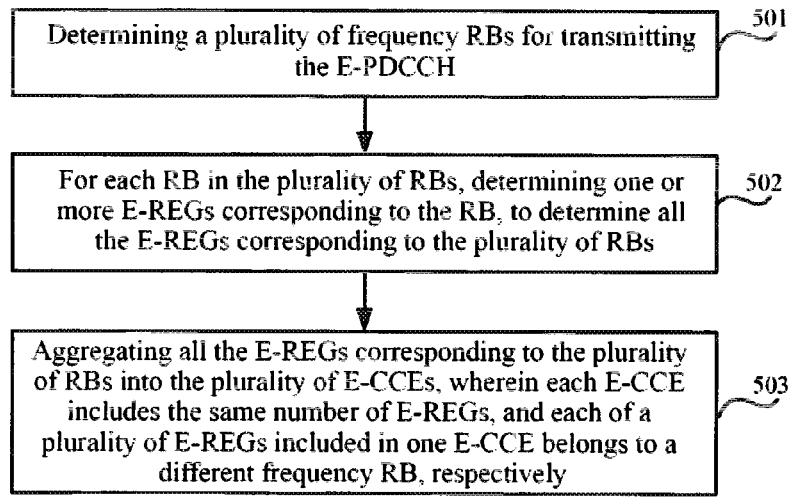
FIG. 5 is a flow chart of a method for determining E-CCEs for transmitting an E-PDCCH in an embodiment of the present invention.

In the embodiment of the present invention, the plurality of E-CCEs for transmitting the E-PDCCH may be determined by adopting the method flow shown in FIG. 5.

Step 501, determining a plurality of frequency RBs for transmitting the E-PDCCH.

Step 502, for each RB in the plurality of RBs, determining one or more E-REGs corresponding to the RB; thus determining all the E-REGs corresponding to the plurality of RBs.

Step 503, aggregating all the E-REGs corresponding to the plurality of RBs into the plurality of E-CCEs, wherein each E-CCE includes the same number of E-REGs, and each of a plurality of E-REGs included in one E-CCE belongs to a different frequency RB, respectively.

In step 502 of the above-mentioned method flow, the E-REGs corresponding to each RB are determined in the following manner: all available REs in one physical resource area block of the RB are determined as an E-REG, wherein the available REs are all REs except REs for transmitting a legacy PDCCH and reference signals (the reference signals may include CRS (Cell-specific Reference Signal), DMRS (Demodulation Reference Signal), CSI-RS (Channel State Information Reference Signal), PRS (Positioning Reference Signal) and the like) in the physical resource area block. The physical resource area block specifically may be the following conditions.

Figure 6A:
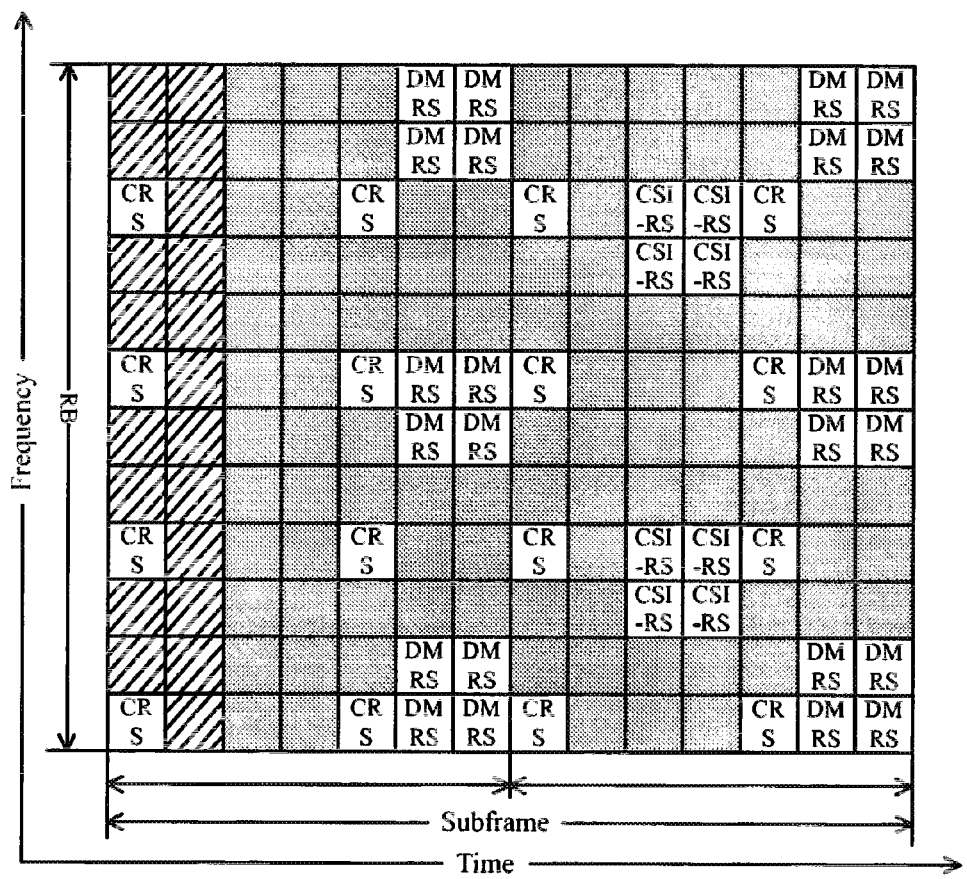
FIG. 6A is a first constitution manner of one E-REG corresponding to one RB in an embodiment of the present invention.

Alt-1: the physical resource area block occupies all OFDM symbols except the OFDM (Orthogonal Frequency-Division Multiplexing) symbols occupied by a legacy PDCCH in one PRB pair (namely physical resource block pair) in the time domain, and occupies all subcarriers of the RB in the frequency domain. As an example shown in FIG. 6A, in one RB, the legacy PDCCH occupies 2 OFDM symbols (the portion filled with oblique lines in FIG. 6A), and the physical resource area block includes 12 OFDM symbols in the time domain and 12 subcarriers in the frequency domain in a subframe.

Figure 6B:
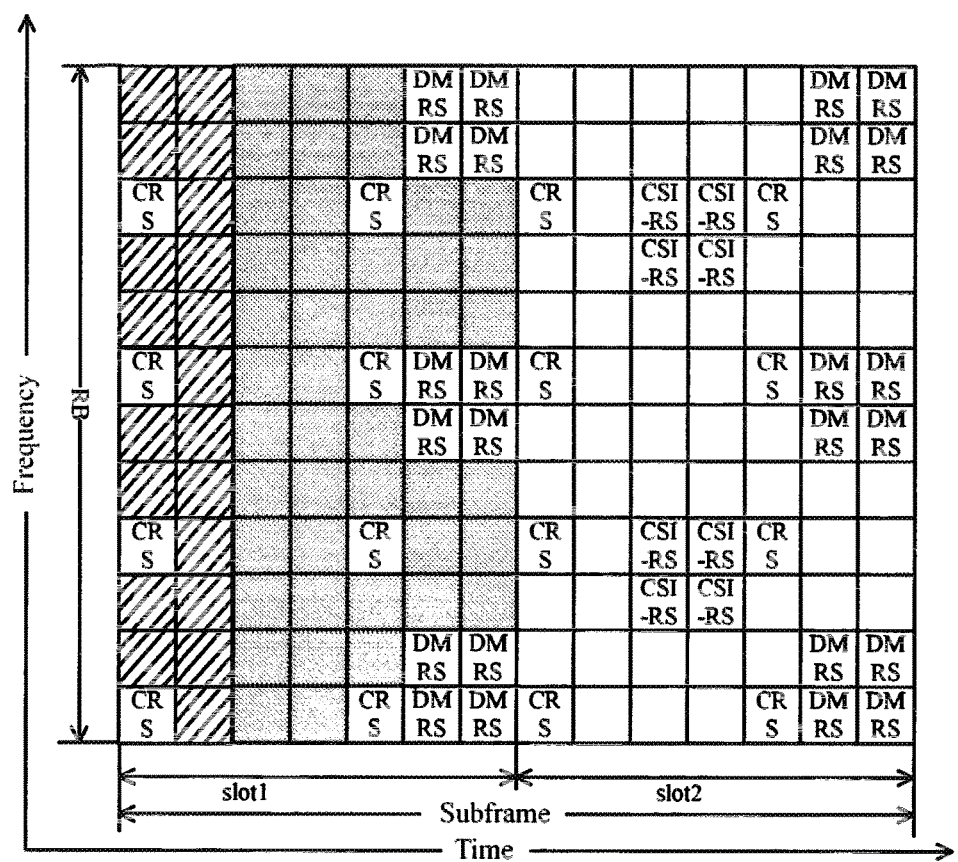
FIG. 6B is a second constitution manner of one E-REG corresponding to one RB in an embodiment of the present invention.

Alt-2: the physical resource area block occupies all OFDM symbols except the OFDM symbols occupied by a legacy PDCCH in one PRB in the time domain, and occupies subcarriers of the RB in the frequency domain. As an example shown in FIG. 6B, the legacy PDCCH occupies 2 OFDM Symbols (the portion filled with oblique lines in FIG. 6B), and a first slot (namely time slot) and a second slot in a downlink subframe constitute respective physical resource area blocks; and one of the physical resource area blocks corresponding to the RB is located in the first slot of the downlink subframe, occupies 5 OFDM symbols in the first slot in the time domain and occupies 12 subcarriers in the frequency domain.

Figure 6C:
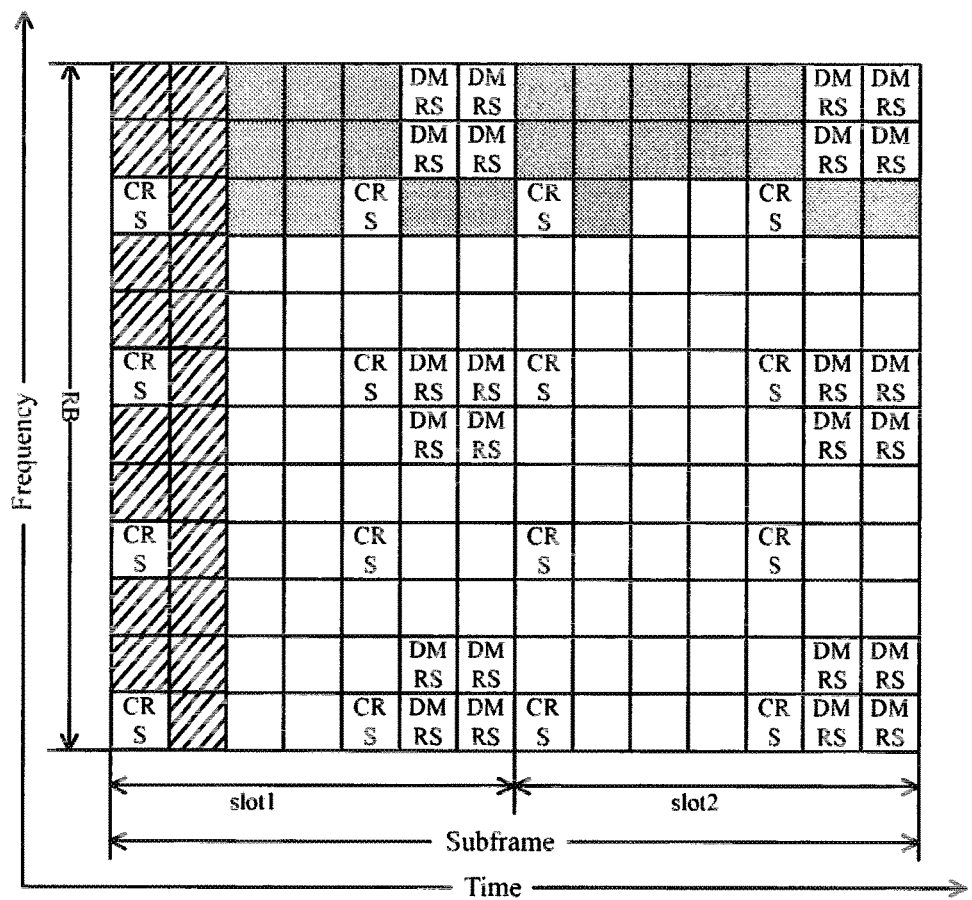
FIG. 6C is a third constitution manner of one E-REG corresponding to one RB in an embodiment of the present invention.

Alt-3: the physical resource area block occupies all OFDM symbols except the OFDM symbols occupied by a legacy PDCCH in one PRB pair in the time domain, and occupies one or more continuous subcarriers of the RB in the frequency domain. As shown in FIG. 6C, when the legacy PDCCH occupies 2 OFDM Symbols (the portion filled with oblique lines in FIG. 6C), one physical resource block area of the RB occupies 12 OFDM symbols in the time domain and occupies 3 subcarriers in the frequency domain.

Figure 6D:
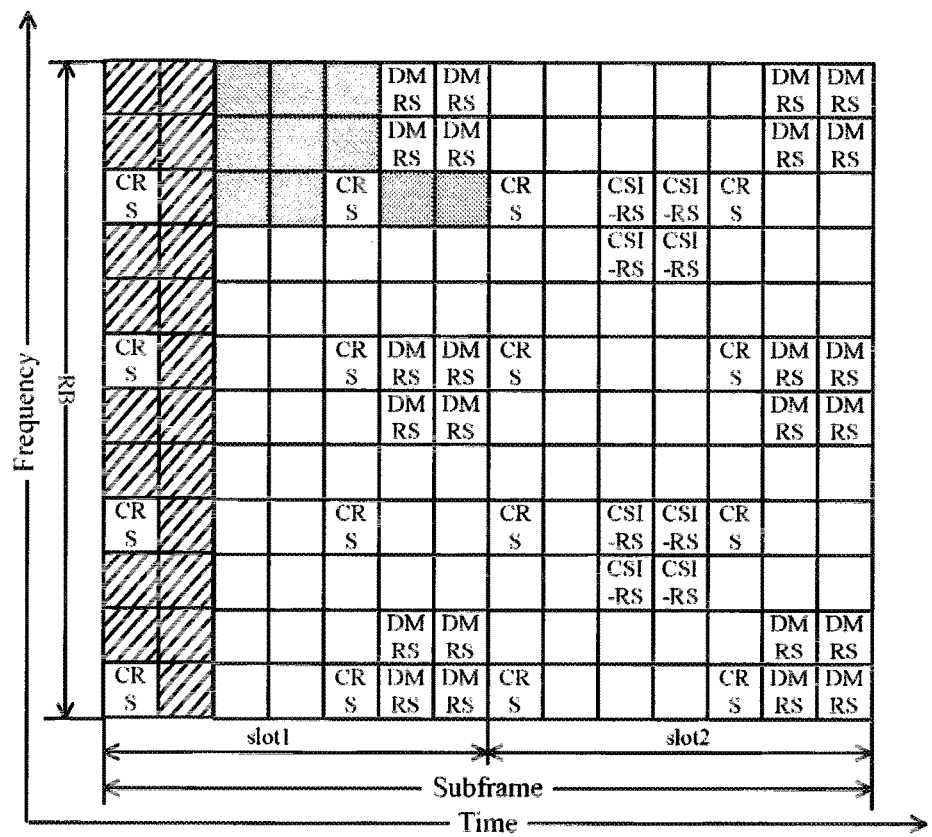
FIG. 6D is a fourth constitution manner of one E-REG corresponding to one RB in an embodiment of the present invention.

Alt-4: the physical resource area block occupies all OFDM symbols except the OFDM symbols occupied by a legacy PDCCH in one PRB in the time domain, and occupies one or more continuous subcarriers of the RB in the frequency domain. As shown in FIG. 6D, the legacy PDCCH occupies 2 OFDM Symbols (the portion filled with oblique lines in FIG. 6D), a first slot and a second slot in a downlink subframe constitute respective physical resource area blocks, and one of the physical resource area blocks corresponding to the RB is located in the first slot of the downlink subframe, occupies 5 OFDM symbols in the first slot in the time domain and occupies 3 subcarriers in the frequency domain.

In the embodiment of the present invention, in step 402 above, each DCI to be transmitted over the E-PDCCH is borne into one or more E-CCEs in the following manner.

For each DCI, determining the number of the E-CCEs for bearing the DCI according to the encoding rate required by the DCI; and selecting the corresponding number of E-CCEs from the plurality of E-CCEs, and bearing the DCI into the selected corresponding number of E-CCEs.

In the embodiment of the present invention, in step 402 above, each DCI to be transmitted over the E-PDCCH may be borne into one or more E-CCEs in the following two manners.

Manner 1: cascading modulation symbols of all DCI to be transmitted, and dividing the cascaded modulation symbol sequence into a plurality of SBs (Sub-blocks), wherein each SB includes the same number of modulation symbols;

sequencing all E-REGs corresponding to the plurality of E-CCEs from low frequency to high frequency, and interleaving all the sequenced E-REGs to form an interleaved E-REG sequence;

sequentially mapping all the cascaded SBs into the interleaved E-REG sequence, wherein each of a plurality of E-REGs corresponding to a plurality of SBs of the same DCI belongs to a different RB, respectively.

Manner 2: sequencing all E-REGs corresponding to the plurality of E-CCEs from low frequency to high frequency to obtain an E-REG sequence;

cascading modulation symbols of all DCI to be transmitted, and dividing the cascaded modulation symbol sequence into a plurality of SBs, wherein each SB includes the same number of modulation symbols; and interleaving the plurality of SBs to obtain an SB sequence, and successively mapping the SB sequence into the E-REG sequence, wherein each of a plurality of E-REGs corresponding to a plurality of SBs of the same DCI belongs to a different RB, respectively.

For describing the above-mentioned manners 1 and 2 more clearly in detail, two examples will be given below respectively for the above-mentioned manners 1 and 2. In the two examples, it is assumed that the number of the E-CCEs for transmitting the E-PDCCH is 4 (represented by E-CCE#1, E-CCE#2, E-CCE#3 and E-CCE#4 respectively), each E-CCE includes four E-REGs, i.e., totally including 16 E-REGs (represented by E-REG#0, E-REG#1 . . . E-REG#15 respectively, wherein E-REG#0 to E-REG#3 belong to the same RB, E-REG#4 to E-REG#7 belong to the same RB, E-REG#8 to E-REG#11 belong to the same RB, and E-REG#12 to E-REG#15 belong to the same RB), the number of the DCI to be transmitted over the E-PDCCH is 4 (represented by DCI#1, DCI#2, DCI#3 and DCI#4), each DCI includes 4 modulation symbols, in the examples, all the modulation symbols corresponding to the four DCI are divided into 16 SBs, each SB includes one modulation symbol, and the SBs and the 16 modulation symbols are in one-to-one correspondence (represented by SB#0, SB#1 . . . SB#15).

When the above-mentioned manner 1 is adopted, the following steps are included.

Step Sa1, sequencing the 16 E-REGs from low frequency to high frequency to obtain an E-REG sequence {E-REG#0, E-REG#1 . . . E-REG#15}, as shown in FIG. 7A.

Step Sa2, interleaving the sequenced 16 E-REGs to obtain an interleaved E-REG sequence {E-REG#0, E-REG#5, E-REG#10, E-REG#15, E-REG#1, E-REG#6, E-REG#11, E-REG#12, E-REG#2, E-REG#7, E-REG#8, E-REG#13, E-REG#3, E-REG#4, E-REG#9, E-REG#14}.

Figure 7A:
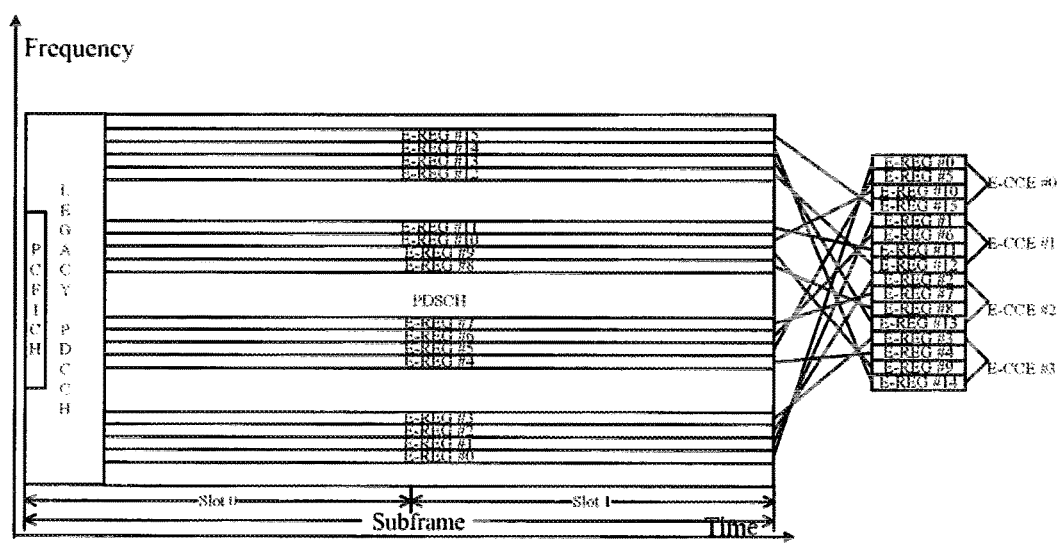
FIG. 7A is a first schematic diagram of aggregating E-REGs into E-CCEs in an embodiment of the present invention.

Step Sa3, according to the interleaved E-REG sequence, aggregating the 16 E-REGs into four E-CCEs, as shown in FIG. 7A, aggregating E-REG#0, E-REG#5, E-REG#10 and E-REG#15 into E-CCE#0; aggregating E-REG#1, E-REG#6, E-REG#11 and E-REG#12 into E-CCE#1; aggregating E-REG#2, E-REG#7, E-REG#13 and E-REG#13 into E-CCE#2; and aggregating E-REG#3, E-REG#4, E-REG#9 and E-REG#14 into E-CCE#3.

Step Sa4, sequentially mapping the 16 SBs corresponding to the four DCI to be transmitted onto the interleaved 16 E-REGs, i.e., mapping SB#0 to SB#15 onto E-REG#0 to E-REG#15 respectively.

When the above-mentioned manner 2 is adopted, the following, steps are included.

Step Sb2, sequencing the 16 E-REGs from low frequency to high frequency to obtain an E-REG sequence {E-REG#0, E-REG#1 . . . E-REG#15}, as shown in FIG. 7B.

Step Sb2, cascading 16 SBs corresponding to 4 DCI to obtain a cascaded SB sequence {SB#0, SB#1 . . . SB#15}.

Step Sb3, interleaving the sequenced 16 SBs to obtain an interleaved SB sequence {SB#0, SB#4, SB#8, SB#12, SB#13, SB#1, SB#5, SB#9, SB#10, SB#14, SB#2, SB#6, SB#7, SB#11, SB#15, SB#3}.

Figure 7B:
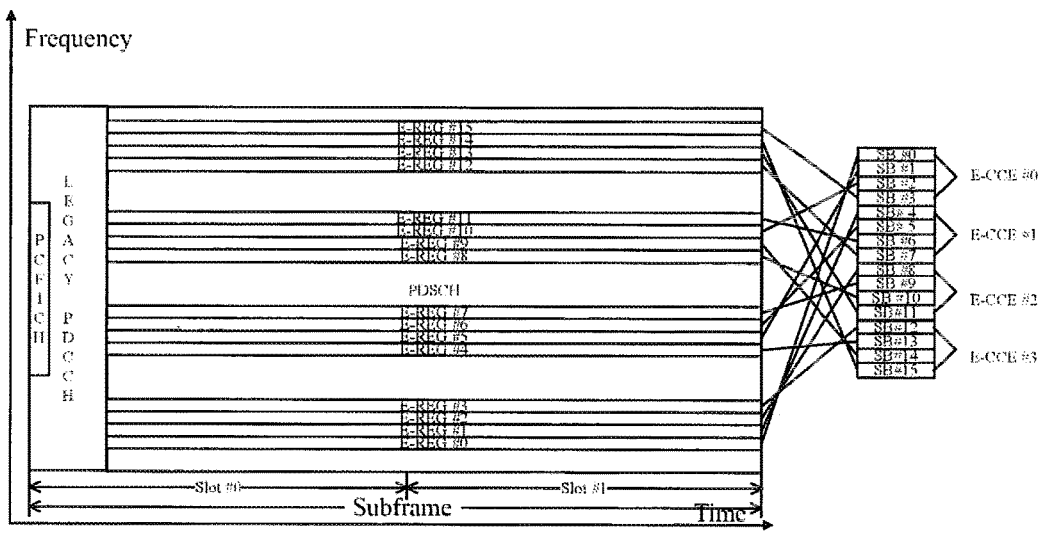
FIG. 7B is a second schematic diagram of aggregating E-REGs into E-CCEs in an embodiment of the present invention.

Step Sb4, aggregating the 16 E-REGs into four E-CCEs according to the sequenced E-REG sequence obtained in step Sb1 as shown in FIG. 7B, aggregating E-REG#0, E-REG#5, E-REG#10 and E-REG#15 into E-CCE#0; aggregating E-REG#1, E-REG#6, E-REG#11 and E-REG#12 into E-CCE#1; aggregating E-REG#2, E-REG#7, E-REG#8 and E-REG#13 into E-CCE#2; and aggregating E-REG#3, E-REG#4, E-REG#9 and E-REG#14 into E-CCE#3.

Step Sb5, sequentially mapping the interleaved 16 SBs onto the 16 sequenced E-REGs, i.e., sequentially mapping SB#0, SB#4, SB#8 and SB#12 onto E-REG#0 to E-REG#3; sequentially mapping SB#13, SB#1, SB#5 and SB#9 onto E-REG#4 to E-REG#7; sequentially mapping SB#10, SB#14, SB#2 and SB#6 onto E-REG#8 to E-REG#11; and sequentially mapping SB#7, SB#11, SB#15 and SB#3 onto E-REG#12 to E-REG#15.

The manner of interleaving the plurality of E-REGs in the above-mentioned example is just a specific example, is not merely limited to the interleaving manner shown in FIG. 7A, and may be flexibly set according to actual needs, for example, may be determined according to the number of the current subframe or the ID of the current cell, which will not be listed one by one herein. Similarly, in the above-mentioned example, the manner of interleaving the plurality of SBs is just a specific example, is not merely limited to the interleaving manner shown in FIG. 7B, and may be flexibly set according to actual needs, for example, may be determined according to the number of the current subframe or determined by the ID of the current cell, which will not be listed one by on herein.

Figure 8:
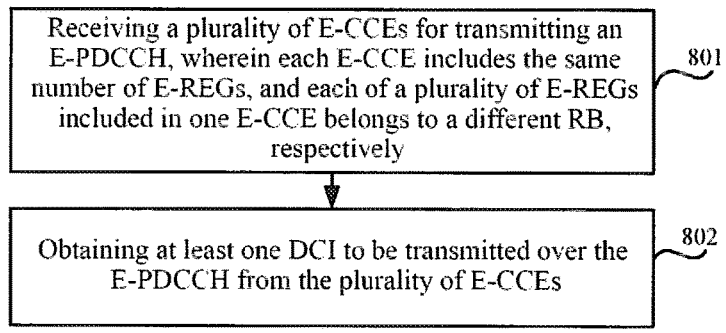
FIG. 8 is a flow chart of a method for receiving control information at a UE side in an embodiment of the present invention.

Based on the foregoing method for transmitting the control information at the base station side, an embodiment of the present invention also provides a method for receiving control information at a UE side, and the method flow shown in FIG. 8 includes the following steps.

Step 801, receiving a plurality of E-CCEs for transmitting an E-PDCCH, wherein each E-CCE includes the same number of E-REGs, and each of a plurality of E-REGs included in one E-CCE belongs to a different RB, respectively.

Step 802, obtaining at least one DCI to be transmitted over the E-PDCCH from the plurality of E-CCEs.

In the embodiment of the present invention, the plurality of E-CCEs for transmitting the E-PDCCH are the ones formed by aggregating all the E-REGs corresponding to a plurality of RBs for transmitting the E-PDCCH, wherein each E-CCE includes the same number of E-REGs, and each of the plurality of E-REGs included in one E-CCE belongs to a different frequency RB, respectively.

The RBs are allocated to the UE by a base station and discretely distributed in a system bandwidth.

In the embodiment of the present invention, the E-REGs corresponding to each RB are the ones determined by all available REs in one physical resource area block of the RB, and the available REs are REs except REs for transmitting a legacy PDCCH and reference signals in the physical resource area block.

The physical resource area block occupies all OFDM symbols except OFDM symbols occupied by the legacy PDCCH in one PRB pair in the time domain, and occupies all subcarriers of the RB in the frequency domain; or the physical resource area block occupies all OFDM symbols except OFDM symbols occupied by the legacy PDCCH in one PRB in the time domain, and occupies all subcarriers of the RB in the frequency domain; or the physical resource area block occupies all OFDM symbols except OFDM symbols occupied by the legacy PDCCH in one PRB pair in the time domain, and occupies one subcarrier or a plurality of continuous subcarriers of the RB in the frequency domain; or the physical resource area block occupies all OFDM symbols except OFDM symbols occupied by the legacy PDCCH in one PRB in the time domain, and occupies one subcarrier or a plurality of continuous subcarriers of the RB in the frequency domain.

In the above-mentioned step 802, obtaining the at least one DCI to be transmitted over the E-PDCCH from the plurality of E-CCEs includes:

de-interleaving an E-REG sequence corresponding to the plurality of E-CCEs to obtain a plurality of E-REGs sequenced from low frequency to high frequency, successively obtaining a plurality of SBs borne in the plurality of E-REGs respectively, and obtaining modulation symbols corresponding to the at least one DCI from the plurality of SBs, thus obtaining the at least one DCI;

or, obtaining a plurality of SBs borne in a plurality of E-REGs corresponding to the plurality of E-CCEs and sequenced from low frequency to high frequency respectively, de-interleaving the plurality of SBs to obtain an SB sequence, and obtaining modulation symbols corresponding to the at least one DCI from the SB sequence, thus obtaining the at least one DCI.

Figure 9:
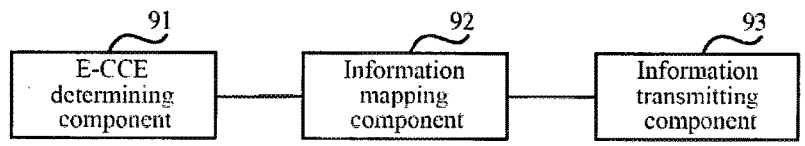
FIG. 9 is a structural schematic diagram of a device for transmitting control information in an embodiment of the present invention.

Based on the foregoing method for transmitting control information, an embodiment of the present invention also provides a device for transmitting control information. The device may be arranged in a base station, the structure of the device may be as shown in FIG. 9, and the device includes:

an E-CCE determining component 91, configured to determine a plurality of E-CCEs for transmitting an E-PDCCH, wherein each E-CCE includes the same number of E-REGs, and each of a plurality of E-REGs included in one E-CCE belongs to a different frequency RB, respectively;

an information mapping component 92, configured to bear each DCI to be transmitted over the E-PDCCH into one or more E-CCEs; and an information transmitting component 93, configured to transmit the E-CCEs bearing the DCI.

Preferably, the E-CCE determining component 91 for determining the plurality of E-CCEs for transmitting the E-PDCCH is further configured to:

determine a plurality of RBs for transmitting the E-PDCCH;

for each RB in the plurality of RBs, determine one or more E-REGs corresponding to the RB, to determine all E-REGs corresponding to the plurality of RBs; and aggregate all the E-REGs corresponding to the plurality of RBs into the plurality of E-CCEs.

Preferably, the E-CCE determining component 91 for determining the E-REGs corresponding to the RB is further configured to:

determine all available REs in one physical resource area block of the RB as an E-REG, wherein the available REs are REs except REs for transmitting a legacy PDCCH and reference signals in the physical resource area block.

The physical resource area block occupies all OFDM symbols except OFDM symbols occupied by the legacy PDCCH in one PRB pair in the time domain, and occupies all subcarriers of the RB in the frequency domain; or the physical resource area block occupies all OFDM symbols except OFDM symbols occupied by the legacy PDCCH in one PRB in the time domain, and occupies all subcarriers of the RB in the frequency domain; or the physical resource area block occupies all OFDM symbols except OFDM symbols occupied by the legacy PDCCH in one PRB pair in the time domain, and occupies one subcarrier or a plurality of continuous subcarriers of the RB in the frequency domain; or the physical resource area block occupies all OFDM symbols except OFDM symbols occupied by the legacy PDCCH in one PRB in the time domain, and occupies one subcarrier or a plurality of continuous subcarriers of the RB in the frequency domain.

Preferably, the information mapping component 92 is further configured to: for each DCI, determine the number of the E-CCEs for bearing the DCI according to the encoding rate required by the DCI; and select the corresponding number of E-CCEs from the plurality of E-CCEs, and bear the DCI into the selected corresponding number of E-CCEs.

Preferably, the information mapping component 92 is further configured to: cascade modulation symbols of all DCI to be transmitted, and divide the cascaded modulation symbol sequence into a plurality of SBs, wherein each SB includes the same number of modulation symbols;

sequence all E-REGs corresponding to the plurality of E-CCEs from low frequency to high frequency, and interleave all the sequenced E-REGs to form an interleaved E-REG sequence;

sequentially map all the cascaded SBs into the interleaved E-REG sequence, wherein each of a plurality of E-REGs corresponding to a plurality of SBs of the same DCI belongs to a different RB, respectively.

The information mapping component 92 is further configured to: sequence all E-REGs corresponding to the plurality of E-CCEs from low frequency to high frequency to obtain an E-REG sequence;

cascade modulation symbols of all DCI to be transmitted, and divide the cascaded modulation symbol sequence into a plurality of SBs, wherein each SB includes the same number of modulation symbols; and interleave the plurality of SBs to obtain an SB sequence, and successively map the SB sequence into the E-REG sequence, wherein each of a plurality of E-REGs corresponding to a plurality of SBs of the same DCI belongs to a different RB, respectively.

Figure 10:
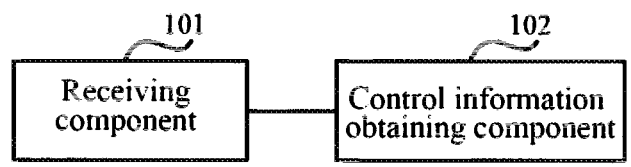
FIG. 10 is a structural schematic diagram of a device for receiving control information in an embodiment of the present invention.

Based on the foregoing method for receiving control information, an embodiment of the present invention also provides a user equipment, the structure of the user equipment is as shown in FIG. 10, and the user equipment includes:

a receiving component 101, configured to receive a plurality of E-CCEs for transmitting an E-PDCCH, wherein each E-CCE includes the same number of E-REGs, and each of a plurality of E-REGs included in one E-CCE belongs to a different RB, respectively; and a control information obtaining component 102, configured to obtain at least one DCI to be transmitted over the E-PDCCH from the plurality of E-CCEs.

Preferable, the control information obtaining component 102 is further configured to:

de-interleave an E-REG sequence corresponding to the plurality of E-CCEs to obtain a plurality of E-REGs sequenced from low frequency to high frequency, successively obtain a plurality of SBs borne in the plurality of E-REGs respectively, and obtain modulation symbols corresponding to the at least one DCI from the plurality of SBs, thus obtaining the at least one DCI.

Preferably, the control information obtaining component 102 is further configured to:

obtain a plurality of SBs borne in a plurality of E-REGs corresponding to the plurality of E-CCEs and sequenced from low frequency to high frequency respectively, de-interleave the plurality of SBs to obtain an SE sequence, and obtain modulation symbols corresponding to the at least one DCI from the SB sequence, thus obtaining the at least one DCI.

In the embodiments of the present invention, on the one hand, the plurality of E-CCEs for transmitting the E-PDCCH are determined, wherein each E-CCE includes the same number of E-REGs, and each of the plurality of E-REGs included in one E-CCE belongs to a different RB, respectively; and each DCI to be transmitted over the E-PDCCH is borne into at least one E-CCE for transmission. By adopting the technical solution of the present invention, because each of the plurality of E-REGs included in one E-CCE belongs to a different frequency RB, respectively, the modulation symbols of the DCI may be diversified on different E-REGs for transmission by bearing each DCI to be transmitted into at least one E-CCE, thus one DCI is transmitted over a plurality of different frequency band resources corresponding to the E-PDCCH, and stability and reliability of DCI transmission are improved; and on the other hand, the E-PDCCH transmission method based on frequency diversity can fully utilize the frequency diversity to transmit the DCI and randomize inter-cell interference, and is easy to implement.

Obviously, various modifications and variations could be made to the present invention by those skilled in the art without departing from the spirit and scope of the present invention. Thus, provided that these modifications and variations made to the present invention are within the scope of the claims of the present invention and equivalent technologies thereof, the present invention is intended to cover these modifications and variations.

What is claimed is:

1. A method for transmitting control information, comprising:
    determining a plurality of enhanced control channel elements, E-CCEs, for transmitting an enhanced physical downlink control channel, E-PDCCH, wherein each E-CCE comprises a same number of enhanced resource element groups, E-REGs, and each of a plurality of E-REGs comprised in one E-CCE belongs to one of a plurality of frequency resource blocks, RBs, respectively, and the plurality of frequency RBs to which the plurality of E-REGs belong are different from each other; and
    bearing each downlink control information, DCI, to be transmitted over the E-PDCCH into at least one E-CCE for transmission;
    wherein determining the plurality of E-CCEs for transmitting the E-PDCCH comprises:
        determining the plurality of frequency RBs for transmitting the E-PDCCH,
        determining one or more E-REGs corresponding to each RB, and
        aggregating all the determined E-REGs into the plurality of E-CCEs.

2. The method of claim 1, wherein the frequency RBs are allocated to a UE by a base station and discretely distributed in a system bandwidth.

3. The method of claim 2, wherein determining the E-REGs corresponding to the RB comprises:
    determining all available resource elements, REs, in one physical resource area block of the RB as an E-REG, wherein the available REs are all REs except REs for transmitting a legacy PDCCH and reference signals in the physical resource area block;
    and wherein the physical resource area block occupies all Orthogonal Frequency Division Multiplexing, OFDM, symbols except OFDM symbols occupied by the legacy PDCCH in one physical resource block pair, PRB pair, in a time domain, and occupies all subcarriers of the RB in a frequency domain; or
    the physical resource area block occupies all OFDM symbols except OFDM symbols occupied by the legacy PDCCH in one PRB in the time domain, and occupies all subcarriers of the RB in the frequency domain; or
    the physical resource area block occupies all OFDM symbols except the OFDM symbols occupied by the legacy PDCCH in one PRB pair in the time domain, and occupies one subcarrier or a plurality of continuous subcarriers of the RB in the frequency domain; or
    the physical resource area block occupies all OFDM symbols except the OFDM symbols occupied by the legacy PDCCH in one PRB in the time domain, and occupies one subcarrier or a plurality of continuous subcarriers of the RB in the frequency domain.

4. The method of claim 1, wherein bearing each DCI to be transmitted over the E-PDCCH into at least one E-CCE comprises:
    for the DCI, determining a number of the E-CCEs for bearing the DCI according to an encoding rate required by the DCI; and selecting the corresponding number of E-CCEs from the plurality of E-CCEs, and bearing the DCI into the selected E-CCEs.

5. The method of claim 1, wherein bearing each DCI to be transmitted over the E-PDCCH into at least one E-CCE comprises:
    cascading modulation symbols of all DCI to be transmitted, and dividing the cascaded modulation symbol sequence into a plurality of sub-blocks, SBs, wherein each SB comprises a same number of modulation symbols;
    sequencing all E-REGs corresponding to the plurality of E-CCEs from low frequency to high frequency, and interleaving all the sequenced E-REGs to form an interleaved E-REG sequence; and
    sequentially mapping all the cascaded SBs into the interleaved E-REG sequence, wherein each of a plurality of E-REGs corresponding to a plurality of SBs of the same DCI belongs to a different RB, respectively.

6. The method of claim 1, wherein bearing each DCI to be transmitted over the E-PDCCH into one or more E-CCEs comprises:
    sequencing all E-REGs corresponding to the plurality of E-CCEs from low frequency to high frequency to obtain an E-REG sequence; and
    cascading modulation symbols of all DCI to be transmitted, and dividing the cascaded modulation symbol sequence into a plurality of SBs, wherein each SB comprises a same number of modulation symbols; and interleaving the plurality of SBs to obtain an SB sequence, and successively mapping the SB sequence into the sequenced E-REG sequence, wherein each of a plurality of E-REGs corresponding to a plurality of SBs of the same DCI belongs to a different RB, respectively.

7. The method of claim 5, wherein a manner of interleaving the sequenced E-REG sequence or the SB sequence is determined according to a number of a current subframe or an ID of a current cell.

8. A method for receiving control information, comprising:
    receiving at least one DCI to be transmitted over an enhanced physical downlink control channel, E-PD- CCH, in a plurality of enhanced control channel elements, E-CCEs, for transmitting the E-PDCCH, wherein each DCI is borne in at least one E-CCE, each E-CCE comprises a same number of enhanced resource element groups, E-REGs, and each of a plurality of E-REGs comprised in one E-CCE belongs to a plurality of frequency resource blocks, RBs, respectively, and the plurality of frequency RBs to which the plurality of E-REGs belong are different from each other;

wherein the plurality of E-CCEs for transmitting the E-PDCCH are formed as follows:
- determining the plurality of frequency RBs for transmitting the E-PDCCH,
- determining one or more E-REGs corresponding to each RB, and
- aggregating all the determined E-REGs into the plurality of E-CCEs.

9. The method of claim 8, wherein the RBs are allocated to a UE by a base station and discretely distributed in a system bandwidth.

10. The method of claim 8, wherein E-REGs corresponding to each RB are the ones determined by all available REs in one physical resource area block of the RB, and the available REs are all REs except REs for transmitting a legacy PDCCH and reference signals in the physical resource area block;

and wherein the physical resource area block occupies all OFDM symbols except OFDM symbols occupied by the legacy PDCCH in one physical resource block pair, PRB pair, in a time domain, and occupies all subcarriers of the RB in a frequency domain; or the physical resource area block occupies all OFDM symbols except OFDM symbols occupied by the legacy PDCCH in one PRB in the time domain, and occupies all subcarriers of the RB in the frequency domain; or the physical resource area block occupies all OFDM symbols except the OFDM symbols occupied by the legacy PDCCH in one PRB pair in the time domain, and occupies one subcarrier or a plurality of continuous subcarriers of the RB in the frequency domain; or the physical resource area block occupies all OFDM symbols except the OFDM symbols occupied by the legacy PDCCH in one PRB in the time domain, and occupies one subcarrier or a plurality of continuous subcarriers of the RB in the frequency domain.

11. The method of claim 8, wherein receiving the at least one DCI to be transmitted over the E-PDCCH in the plurality of E-CCEs for transmitting the E-PDCCH comprises:
de-interleaving an E-REG sequence corresponding to the plurality of E-CCEs to obtain a plurality of E-REGs sequenced from low frequency to high frequency, successively obtaining a plurality of sub-blocks, SBs, borne in the plurality of E-REGs respectively, and obtaining modulation symbols corresponding to the at least one DCI from the plurality of SBs, to obtain the at least one DCI.

12. The method of claim 8, wherein receiving the at least one DCI to be transmitted over the E-PDCCH in the plurality of E-CCEs for transmitting the E-PDCCH comprises:
obtaining a plurality of SBs borne in a plurality of E-REGs corresponding to the plurality of E-CCEs and sequenced from low frequency to high frequency respectively, de-interleaving the plurality of SBs to obtain an SB sequence, and obtaining modulation symbols corresponding to the at least one DCI from the SB sequence, to obtain the at least one DCI.

13. A device for receiving control information, comprising:
a receiving component, configured to receive a plurality of enhanced control channel elements, E-CCEs, for transmitting an enhanced physical downlink control channel, E-PDCCH, wherein each E-CCE comprises a same number of enhanced resource element groups, E-REGs, and each of a plurality of E-REGs comprised in one E-CCE belongs to a plurality of frequency resource blocks, RBs, respectively, and the plurality of frequency RBs to which the plurality of E-REGs belong are different from each other; and
a control information obtaining component, configured to obtain at least one downlink control information, DCI, to be transmitted over the E-PDCCH from the plurality of E-CCEs;
wherein the plurality of E-CCEs for transmitting the E-PDCCH are formed as follows:
- determining the plurality of frequency RBs for transmitting the E-PDCCH,
- determining one or more E-REGs corresponding to each RB, and
- aggregating all the determined E-REGs into the plurality of E-CCEs.

14. The device of claim 13, wherein the control information obtaining component is further configured to:
de-interleave an E-REG sequence corresponding to the plurality of E-CCEs to obtain a plurality of E-REGs sequenced from low frequency to high frequency, successively obtain a plurality of sub-blocks, SBs, borne in the plurality of E-REGs respectively, and obtain modulation symbols corresponding to the at least one DCI from the plurality of SBs, thus obtaining the at least one DCI.

15. The device of claim 13, wherein the control information obtaining component is further configured to:
obtain a plurality of SBs borne in a plurality of E-REGs corresponding to the plurality of E-CCEs and sequenced from low frequency to high frequency respectively, de-interleave the plurality of SBs to obtain an SB sequence, and obtain modulation symbols corresponding to the at least one DCI from the SB sequence, thus obtaining the at least one DCI.

16. The method of claim 6, wherein a manner of interleaving the sequenced E-REG sequence or the SB sequence is determined according to a number of a current subframe or an ID of a current cell.

* * * * *